F. D. & R. S. BROWN.
TIRE.
APPLICATION FILED MAY 29, 1915.
1,185,365.
Patented May 30, 1916.
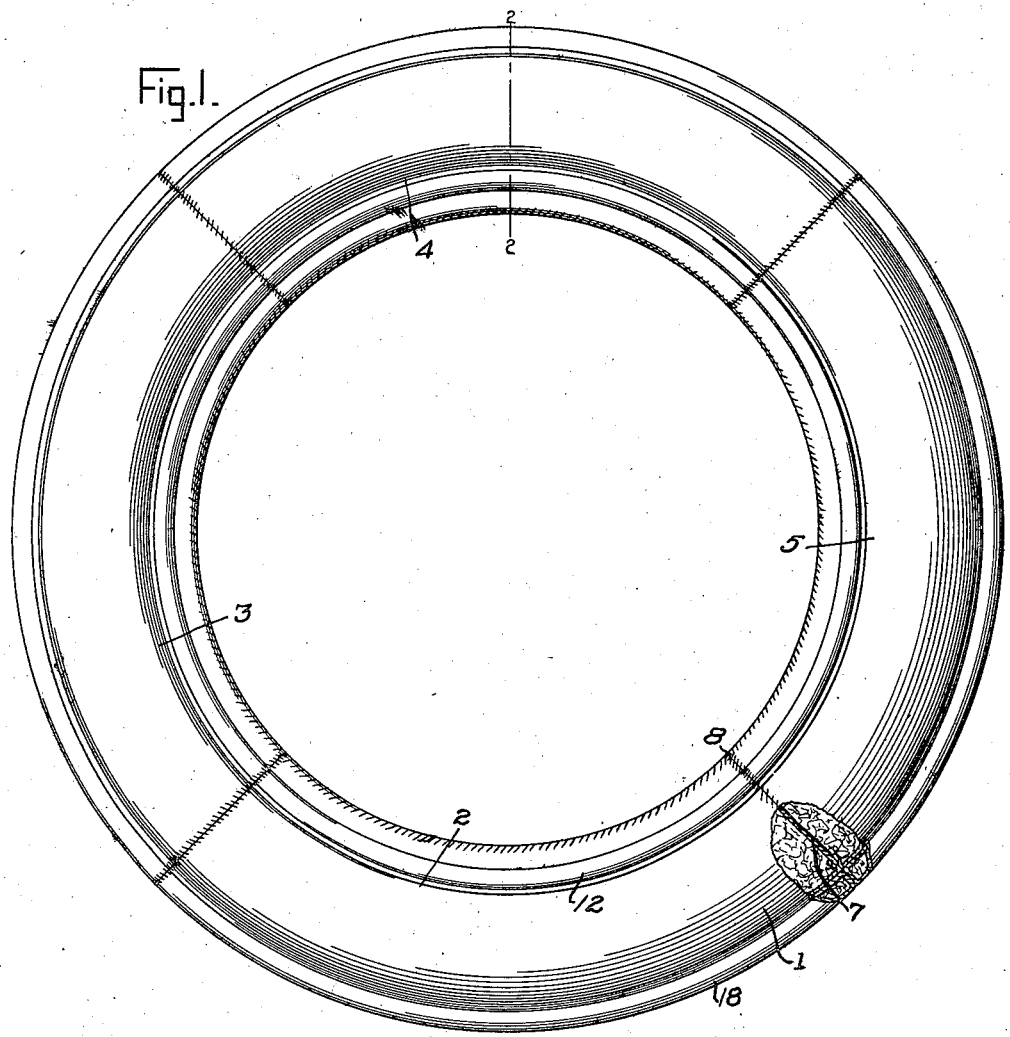
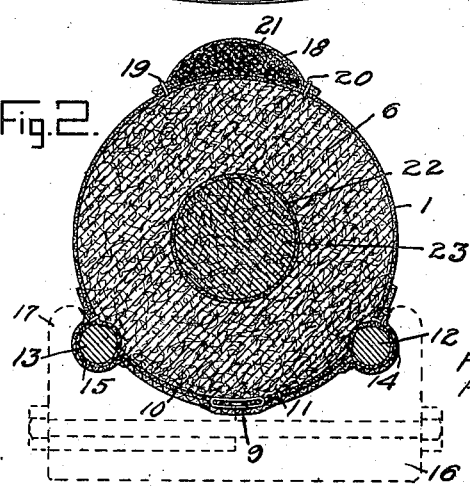
WITNESSES
INVENTORS
Franklin D. Brown.
Rose Seals Brown.
BY
ATTORNEYS

UNITED STATES PATENT OFFICE.

FRANKLIN D. BROWN AND ROSE SEALS BROWN, OF JOSEPHINE COUNTY, NEAR GRANTS PASS, OREGON.

TIRE.

1,185,365.　　　　Specification of Letters Patent.　　Patented May 30, 1916.

Application filed May 29, 1915. Serial No. 31,166.

*To all whom it may concern:*

Be it known that we, FRANKLIN D. BROWN and ROSE SEALS BROWN, citizens of the United States, and residents of the county of Josephine, near Grants Pass, State of Oregon, have invented a new and Improved Tire, of which the following is a full, clear, and exact description.

This invention relates to tires and particularly to a tire which will act as a substitute for pneumatic tires and also as a substitute for rubber in solid tires, and has for an object the provision of an improved simple and strong structure which presents resilient means without danger of puncturing or skidding.

Another object of the invention is to provide a tire with a resilient semi-solid filling formed of wool waste and arranged so as to hold the casing properly distended while allowing a free resilient action of the various parts.

A still further object in view is to provide a tire structure which will act as a covering for pneumatic tires or other forms of tires, as well as act as a puncture preventing construction.

In the accompanying drawings: Figure 1 is a side view disclosing an embodiment of the invention; Fig. 2 is a section through Fig. 1 on line 2—2, the same being on an enlarged scale.

In constructing a tire embodying the invention it is aimed to produce a tire having the resilient effect of a pneumatic tire without presenting the disadvantages of producing a construction that will puncture and skid. In producing a tire of this character a casing is provided and a filling is arranged in the casing so as to afford means for maintaining the casing distended. This filling may be of any suitable kind but preferably wool waste is used.

In the accompanying drawings an embodiment of the invention is disclosed in which 1 indicates the casing, which casing is formed from any suitable material, preferably canvas, and also arranged preferably in sections 2, 3, 4 and 5, said sections being secured together by any suitable means such as stitching, as shown in Fig. 1. It is of course evident that a greater or less number of sections could be used without departing from the spirit of the invention, and if desired a continuous ring could be used instead of the sections. The arrangement of sections is preferable as it prevents the filling 6 of wool waste from packing to any appreciable extent or from moving about in the casing. In order to insure this action a partition 7 is provided between the various sections, said partition being formed from canvas or other suitable material, as for instance transversely arranged threads, whereby it would be impossible for the waste 6 from one section to pass to the next adjacent section.

As shown in Fig. 1 the sections are held together by transverse stitching 8 and laced together as shown in Fig. 2 by suitable lacing 9. Eyelets may be provided in the casing for receiving the lacing 9 whereby the lacing may be applied for holding the casing in a tubular form without danger of injuring the tire. In order to protect this lacing against water or abrasion a flap or protecting strip 10 is provided which is held in place by suitable stitching 11. Arranged on opposite sides of the lacing 9 are retaining reeds 12 and 13 which may be formed from wood, coil springs or other suitable light standard material and which are held in place by strips 14 and 15 sewed to the body of the tire, as clearly shown in Fig. 2. The reeds 12 and 13 are adapted to fit in suitable grooves in the rim 16 of the wheel, section 17 of the rim being removable or at least adjustable so as to admit the reeds, as clearly shown in Fig. 2. In case other forms of rims are used the tire may be easily adapted to such other forms of rims, as for instance, those having straight sides or those commonly known as quick detachable rims where, in fact, any form of rim, either straight, clencher style or concave may be fitted with the tire by simply rearranging the retaining members so as to adapt the tire to the particular rim.

The invention resides in the tire and not in the rim so that it is to be understood that the principle disclosed in the tire may be applied to any form of rim without in any way departing from the spirit of the invention.

In order that the tread may present a double wearing surface, an auxiliary strip 18 is provided and extends entirely around the tire, said strip being held in place by lines of stitching 19 and 20. This strip also may be formed in sections, as shown in Fig.

1, or continuous as preferred. This wearing strip may be removed and renewed at nominal expense when worn. Packing 21 is arranged within the strip 18 so as to provide a wearing surface on the tread. It is evident that the strip 18 and the wool waste packing 21 may be renewed at any time.

Arranged centrally of the casing 1 is an inner casing 22 which is filled with a packing 23 of wool waste or other suitable material. By providing the central or inner casing 22 and the waste packing 23 therein a structure is provided which will not readily pack into lumps. The waste used is divided up into comparatively small sections so that all tendency to crowding to one place and there packing to an undesirable extent has been obviated.

The packing 6 in the casing 1 may be loose or formed in any suitable way, and also the packing 23 in the inner casing 22 may be formed in any desired way, but preferably the packing 23 in the casing 22 is merely loose waste packing arranged in casing 22 while the packing 6 in casing 1 is preferably wool waste formed into loose ropes, which ropes are wound spirally around the stuffed inner casing 22. This structure is provided in each section when the device is formed in sections. Also the canvas or covering fabric, that is, the casings 1 and 22, are either cut on the bias or woven in this manner so that the same cannot be unequally stretched.

After the tire has been formed it is submerged in some waterproofing compound, preferably asphalt in a heated condition or a mixture of asphalt and mineral paint, so as to not only waterproof the tire but provide a water-resisting material. The asphalt is permitted merely to saturate the casing and slightly the outer part of the packing, whereby a good wearing outer surface is presented while the packing is maintained in its original condition for providing a yielding and resilient support.

What we claim is:—

1. In a tire of the character described, a plurality of arc-shaped tubular sections, means for securing said sections together end to end, a filling of wool waste arranged in said sections, and means at the juncture of each section for preventing the waste from shifting longitudinally of the section.

2. In a tire of the character described, a casing, a wool waste filling therefor provided with an annular bore or passageway, a casing arranged in said bore or passageway, a wool waste filling arranged in said last mentioned casing and dividing members for preventing the shifting of said filling.

In testimony whereof we have signed our names to this specification in the presence of two subscribing witnesses.

FRANKLIN D. BROWN.
ROSE SEALS BROWN.

Witnesses:
HANS F. JENSEN,
CRIS JENSEN.